US011455110B1

(12) United States Patent
Sasson et al.

(10) Patent No.: US 11,455,110 B1
(45) Date of Patent: Sep. 27, 2022

(54) DATA DEDUPLICATION

(71) Applicant: International Business Machines Corporation, Armonk, NY (US)

(72) Inventors: Ben Sasson, North Baddesley (GB); Paul Nicholas Cashman, Alton (GB); Dominic Tomkins, Alton (GB); Florent C. Rostagni, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/468,732

(22) Filed: Sep. 8, 2021

(51) Int. Cl.
*G06F 3/06* (2006.01)

(52) U.S. Cl.
CPC .......... *G06F 3/0641* (2013.01); *G06F 3/067* (2013.01); *G06F 3/0626* (2013.01); *G06F 3/0652* (2013.01); *G06F 3/0656* (2013.01)

(58) Field of Classification Search
None
See application file for complete search history.

(56) References Cited

U.S. PATENT DOCUMENTS

| | | | | |
|---|---|---|---|---|
| 5,003,459 A * | 3/1991 | Ramanujan | ......... | G06F 12/1045 711/3 |
| 5,295,253 A * | 3/1994 | Ducousso | ......... | G06F 12/1027 711/E12.074 |
| 5,752,275 A * | 5/1998 | Hammond | ......... | G06F 12/1027 711/212 |
| 5,897,662 A * | 4/1999 | Corrigan | ......... | G06F 12/1009 718/1 |
| 7,376,807 B2 * | 5/2008 | Moyer | ......... | G06F 12/1027 711/138 |
| 9,116,858 B1 * | 8/2015 | Yokoi | ......... | H04L 67/1097 |
| 9,256,475 B1 | 2/2016 | Aron | | |
| 9,563,549 B2 * | 2/2017 | Ahn | ......... | G06F 12/0246 |
| 2005/0108497 A1 * | 5/2005 | Bridges | ......... | G06F 9/342 712/E9.041 |
| 2005/0249058 A1 * | 11/2005 | Chu | ......... | G11B 20/10009 |
| 2007/0198804 A1 * | 8/2007 | Moyer | ......... | G06F 12/1027 711/202 |
| 2007/0283115 A1 * | 12/2007 | Freeman | ......... | G06F 21/6227 711/163 |
| 2007/0283123 A1 * | 12/2007 | Vick | ......... | G06F 12/0284 711/E12.013 |
| 2007/0283124 A1 * | 12/2007 | Menczak | ......... | G06F 12/1045 711/E12.068 |

(Continued)

OTHER PUBLICATIONS

"Improved Cohort Management for Version Updates in Data Deduplication" U.S. Appl. No. 16/265,722, filed Feb. 1, 2019, 35 pages.

(Continued)

*Primary Examiner* — Christopher D Birkhimer
(74) *Attorney, Agent, or Firm* — Alexander G. Jochym

(57) ABSTRACT

Embodiments of the present invention provide concepts for handling a handover of ownership of data from a source to a referrer in a data deduplication environment. By performing a handover of the ownership of the data from the source to the referrer, the number of processes required to access the data may be reduced and so the performance of the system may be improved. The identification of a source for performing the handover on may be performed by way of a volatile cache.

20 Claims, 10 Drawing Sheets

(56) References Cited

U.S. PATENT DOCUMENTS

| | | | | |
|---|---|---|---|---|
| 2007/0283125 A1* | 12/2007 | Manczak | ............ | G06F 12/1036 711/207 |
| 2009/0037682 A1* | 2/2009 | Armstrong | .......... | G06F 12/1475 718/1 |
| 2009/0037941 A1* | 2/2009 | Armstrong | .......... | G06F 12/1475 719/328 |
| 2009/0070643 A1* | 3/2009 | Anvekar | ................ | G06F 11/263 714/718 |
| 2013/0054927 A1* | 2/2013 | Raj | ....................... | G06F 3/0608 711/170 |
| 2013/0339655 A1* | 12/2013 | Hom | ................... | G06F 12/1027 711/207 |
| 2017/0003914 A1* | 1/2017 | Gschwind | ............. | G06F 3/0619 |
| 2017/0147224 A1* | 5/2017 | Kumar | .................. | G06F 3/0611 |
| 2018/0232140 A1 | 8/2018 | Harnik | | |
| 2020/0034310 A1* | 1/2020 | Drzewiecki | ............. | G06F 12/08 |
| 2020/0133881 A1* | 4/2020 | Campbell | ............ | G06F 12/0893 |
| 2020/0183856 A1* | 6/2020 | Campbell | ............ | G06F 12/1018 |
| 2020/0250093 A1* | 8/2020 | Campbell | ............ | G06F 12/0815 |
| 2020/0250099 A1* | 8/2020 | Campbell | ............ | G06F 12/0842 |
| 2021/0011776 A1 | 1/2021 | Thirumalai | | |
| 2021/0042050 A1* | 2/2021 | Schauer | ................ | G06F 3/0647 |
| 2021/0326271 A1* | 10/2021 | Sasson | .................. | G06F 3/0652 |
| 2022/0035556 A1* | 2/2022 | Cashman | ................ | G06F 12/10 |

OTHER PUBLICATIONS

Disclosed Anonymously et al., "Method for Improving Volume Delete Performance in a Deduplicated Environment", IP.COM Prior Art Database Technical Disclosure, IPCOM000263546D, Sep. 10, 2020, pp. 1-6.

Mell et al., "The NIST Definition of Cloud Computing", National Institute of Standards and Technology, Special Publication 800-145, Sep. 2011, 7 pages.

Wikipedia, "Adaptive Replacement Cache", Downloaded from internet on Aug. 12, 2021, pp. 1-3, <https://en.wikipedia.org/wiki/Adaptive_replacement_cache>.

* cited by examiner

DATA DEDUPLICATION

BACKGROUND

The present invention generally relates to the field of data deduplication in computer systems, and more particularly, systems and methods for handling data deduplication in IT systems.

In operations management and IT service management systems, there exist multiple implementations for performing storage deduplication. Storage deduplication is designed to ensure that a set of data is only stored in the system once at a grain level. Many host volumes may then reference this single instance of the stored data, rather than each host volume requiring a separately stored data set.

A popular model of storage deduplication is called the source and referrer model. A source contains the address to the physical location of the data associated with the host volume's virtual address. When reading the source, the system would access the metadata from the source regarding the physical address of the stored data, extract the physical address of the data from the metadata and issue read requests to the physical storage to retrieve the stored data.

A referrer may be written on a deduplication hit against an already existing source. The referrer points to a virtual address at the source, which in turn points to the physical location of the stored data.

SUMMARY

The present invention seeks to provide a system for handling a handover of ownership of data from a source to a referrer. The present invention also seeks to provide a system for handling a handover of ownership of data from a source to a referrer by way of a volatile cache. The present invention yet further seeks to provide a method for handling a handover of ownership of data from a source to a referrer. Such methods may be computer-implemented. That is, such methods may be implemented in a computer infrastructure having computer executable code tangibly embodied on a computer readable storage medium having programming instructions configured to perform a proposed method. The present invention further seeks to provide a computer program product including computer program code for implementing the proposed concepts when executed on a processor.

According to an aspect of the present invention there is provided a system for handling a handover of ownership of data from a source to a referrer, wherein the source comprises a virtual address, which comprises a physical address of a set of data on a system memory, and the referrer is adapted to point an incoming request for the set of data to the virtual address of the source, wherein the system is adapted to: identify a source accessed by a request pointed to the source by a referrer; and perform a handover of ownership of the virtual address of the identified source to the referrer.

According to another aspect of the present invention, there is provided a method for handling a handover of ownership of data from a source to a referrer of a system, wherein the source comprises a virtual address, which comprises a physical address of a set of data on a system memory, and the referrer is adapted to point an incoming request for the set of data to the virtual address of the source, wherein the method comprises the steps of: identifying a source accessed by a request pointed to the source by a referrer; and performing a handover of ownership of the virtual address of the identified source to the referrer.

Embodiments may be employed in combination with conventional/existing data handling and/or data deduplication systems. In this way, embodiments may integrate into legacy systems so as to improve and/or extend their functionality and capabilities. An improved data deduplication system may therefore be provided by proposed embodiments.

According to another embodiment of the present invention, there is provided a computer program product for handling a handover of ownership of data from a source to a referrer, wherein the source comprises a virtual address, which comprises a physical address of a set of data on a system memory, and the referrer is adapted to point an incoming request for the set of data to the virtual address of the source, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

Thus, there may be proposed concepts for handling a handover of ownership of data from a source to a referrer. For instance, embodiments may provide for a means of performing a handover of the ownership of the virtual address of the source to the referrer. By handing over the ownership of the virtual address in this manner, the number of processes required to access the data may be reduced and so the performance of the deduplication system may be improved.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
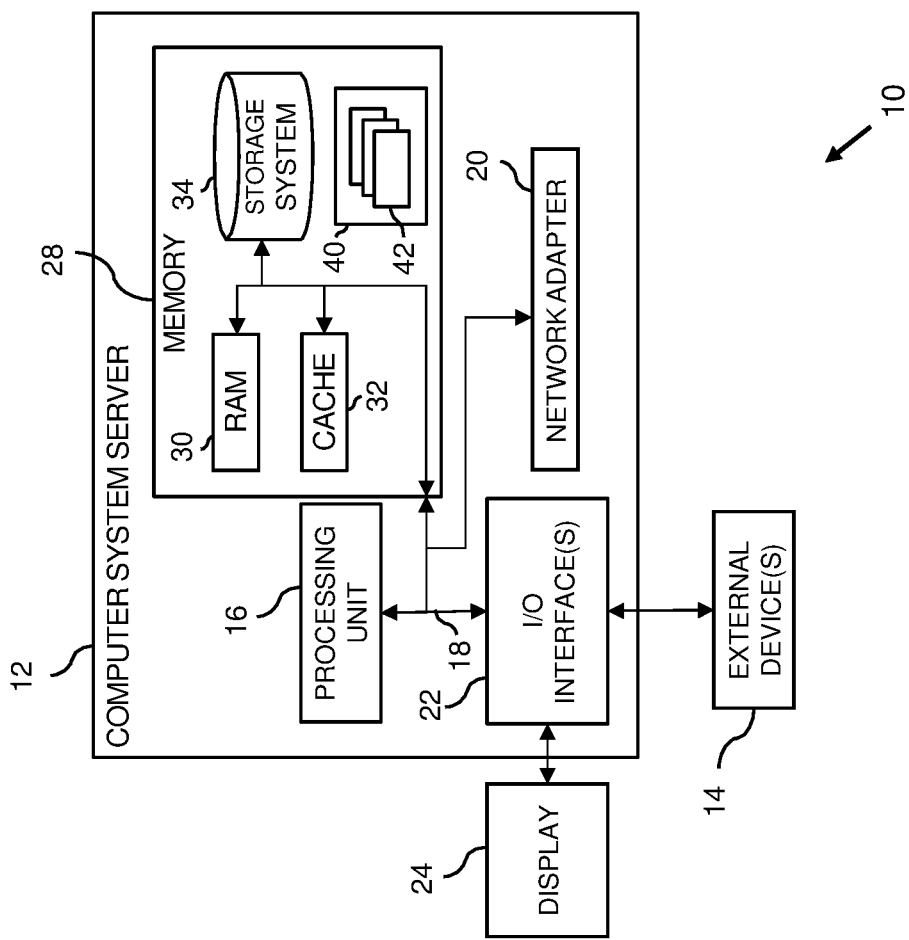
FIG. 1 depicts a cloud computing node according to an embodiment of the present invention.

It should be understood that the figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

The technical character of the present invention generally relates to data handling, and more particularly, to data deduplication concepts that may, for example, perform a handover of ownership of data in a system. More specifically, embodiments of the present invention provide a system for handling a handover of ownership of data from a source to a referrer, wherein the source comprises a virtual address, which comprises a physical address of a set of data on a system memory, and the referrer is adapted to point an incoming request for the set of data to the virtual address of the source, wherein the system is adapted to: identify a source accessed by a request pointed to the source by a referrer; and perform a handover of ownership of the virtual address of the identified source to the referrer.

The invention provides a means of handling a handover of ownership of data from a source to a referrer. The source and referrer model is a popular implementation of storage deduplication, which is intended to ensure that data is only stored once at a grain level. A source contains the physical location of the data associated with the volume's virtual address. When reading the source, the system may extract the physical location of the data from the metadata of the source and then issue read requests to the physical storage to retrieve the data itself. A referrer is written on a deduplication hit against an existing source. The referrer points to a virtual address at the source, which in turn points at the physical location of the data. By performing a handover of the ownership of the virtual address of the source to the referrer, the number of processes required to access the data may be reduced and so the performance of the deduplication system may be improved.

A drawback of the source and referrer model arises in that in order to perform a read to an address, a referrer will require an additional metadata access operation, which may have a detrimental effect on the performance of the system when attempting to access referred data.

A further drawback of the source and referrer model may arise when the need to perform a rehome procedure occurs. A rehome procedure is a procedure that occurs when a source can no longer hold the data, for example, when a user asks for the source volume to be deleted, and is the action of changing the ownership of the data from the original source to one of the referrers. If multiple referrers were linked to the same source data, they will ideally all point at the new source after the rehome procedure; however, this can be prevented by other processes running on the system, resulting in reduced deduplication ratio due to multiple instances of the stored data.

There is therefore a need for an improved means of handling data deduplication in a system.

In an embodiment, the system comprises a volatile cache adapted to identify the source accessed by a request pointed to the source by a referrer. By utilizing a volatile cache to identify a source accessed by a request pointed to the source by a referrer, the system resources required to identify a source may be reduced as there is no need to harden or mirror the data on the volatile cache. In an embodiment, the volatile cache is read-only.

In an embodiment, the system comprises a plurality of sources, and wherein the volatile cache is adapted to generate a list of sources accessed by a request pointed to each source by an associated referrer. In this way, the volatile cache may contain a list of sources on the system that may be candidates for performing the handover process on.

In an embodiment, the volatile cache is adapted to monitor a characteristic of the sources over time, and wherein the volatile cache is adapted to sort the list of sources according to the monitored characteristic. In this way, the most impactful sources may be brought to the top of the volatile cache based on a given monitored characteristic of the sources.

In an embodiment, the monitored characteristic is an access frequency of the sources. In this way, the sources accessed most frequently may be brought to the top of the list of sources as the more frequently a source is accessed, the greater impact said source will have on the system performance.

In an embodiment, the system comprises a plurality of referrers that point to a source, and wherein the volatile cache is further adapted to generate a list of referrers that point a request to the source. In this way, it may be possible to monitor where the requests accessing the source are originating from.

In an embodiment, the volatile cache is adapted to sort the list of referrers according to a frequency of requests pointed to the source by each referrer. In this way, the referrers pointing the greatest number of access requests to the source may be identified as the more impactful referrers for a given source.

In an embodiment, the system further comprises a handover component adapted to perform the handover of ownership of the virtual address of the identified source to the referrer.

In an embodiment, the system comprises a volatile cache adapted to identify a plurality of sources accessed by requests pointed to each of the sources by an associated referrer, the volatile cache being adapted to generate a list of the plurality of sources accessed, and wherein the handover component is adapted to: select one or more of the sources from the list of sources; and perform a handover of the ownership of the virtual address from the selected one or more sources to the referrers associated with each selected source. In this way, the handover component may select one or more sources from the list of sources as candidates for performing the handover process on.

In an embodiment, the volatile cache is adapted to monitor a characteristic of the sources over time, and wherein the handover component is adapted to select the one or more of the sources from the list of sources based on the monitored characteristic. In this way, the handover component may perform the handover process on the one or more sources from the list of sources that are considered to be the most impactful on the system performance according to the monitored characteristic.

In an embodiment, the handover component is adapted to perform the handover of ownership of the virtual address of the identified source to the referrer when the source is accessed by a request. In this way, the handover component may perform the handover process in an opportunistic manner when the source is being accessed.

In an embodiment, the system is further adapted to, after the handover of ownership of the virtual address from the source to the referrer has been performed, update the list of sources to remove the sources that have undergone the handover process. In this way, the volatile cache may be updated dynamically in response to the sources that have undergone the handover process, meaning that the list of sources will dynamically display the sources that are the most impactful to the system at the time.

In an embodiment, the system is further adapted to, after the handover of ownership of the virtual address from the source to the referrer has been performed, updating the source and the referrer to point an incoming request to the virtual address at the referrer. In this way, those references to the source that have not yet been updated will be pointed to the referrer after the handover process has been performed.

Embodiments of the present invention further provide a method for handling a handover of ownership of data from a source to a referrer of a system, wherein the source comprises a virtual address, which comprises a physical address of a set of data on a system memory, and the referrer is adapted to point an incoming request for the set of data to the virtual address of the source, wherein the method comprises the steps of: identifying a source accessed by a request pointed to the source by a referrer; and performing a handover of ownership of the virtual address of the identified source to the referrer.

In an embodiment, the system comprises a plurality of sources, and wherein the method further comprises: generating a list of sources accessed by a request pointed to each source by an associated referrer by way of a volatile cache; selecting one or more of the sources from the list of sources by way of a handover component; and performing a handover of the ownership of the virtual address from the selected one or more sources to the referrers associated with each selected source by way of the handover component.

In an embodiment, the method further comprises monitoring a characteristic of the sources over time by way of the volatile cache and wherein, selecting the one or more of the sources from the list of sources by way of the handover component is based on the monitored characteristic.

Embodiments of the present invention further provide a computer program product for handling a handover of ownership of data from a source to a referrer, wherein the source comprises a virtual address, which comprises a physical address of a set of data on a system memory, and the referrer is adapted to point an incoming request for the set of data to the virtual address of the source, the computer program product comprising a computer readable storage medium having program instructions embodied therewith, the program instructions executable by a processing unit to cause the processing unit to perform a method comprising: identifying a source accessed by a request pointed to the source by a referrer; and performing a handover of ownership of the virtual address of the identified source to the referrer.

In an embodiment, the computer program product comprising a computer readable storage medium having program instructions embodied therewith, the program instructions executable by a processing unit to cause the processing unit to perform a method further comprising the steps of: generating a list of sources accessed by a request pointed to each source by an associated referrer by way of a volatile cache; selecting one or more of the sources from the list of sources by way of a handover component; and performing a handover of the ownership of the virtual address from the selected one or more sources to the referrers associated with each selected source by way of the handover component.

Embodiments of the present invention further provide a processing system comprising at least one processor and the computer program product of described above, wherein the at least one processor is adapted to execute the computer program code of said computer program product.

It is understood in advance that although this disclosure includes a detailed description on cloud computing, implementation of the techniques recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client 80 can be implemented as one or more of the program modules 42. Additionally, the DHCP client 80 may be implemented as separate dedicated processors or a single or several processors to provide the functionality described herein. In embodiments, the DHCP client 80 performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
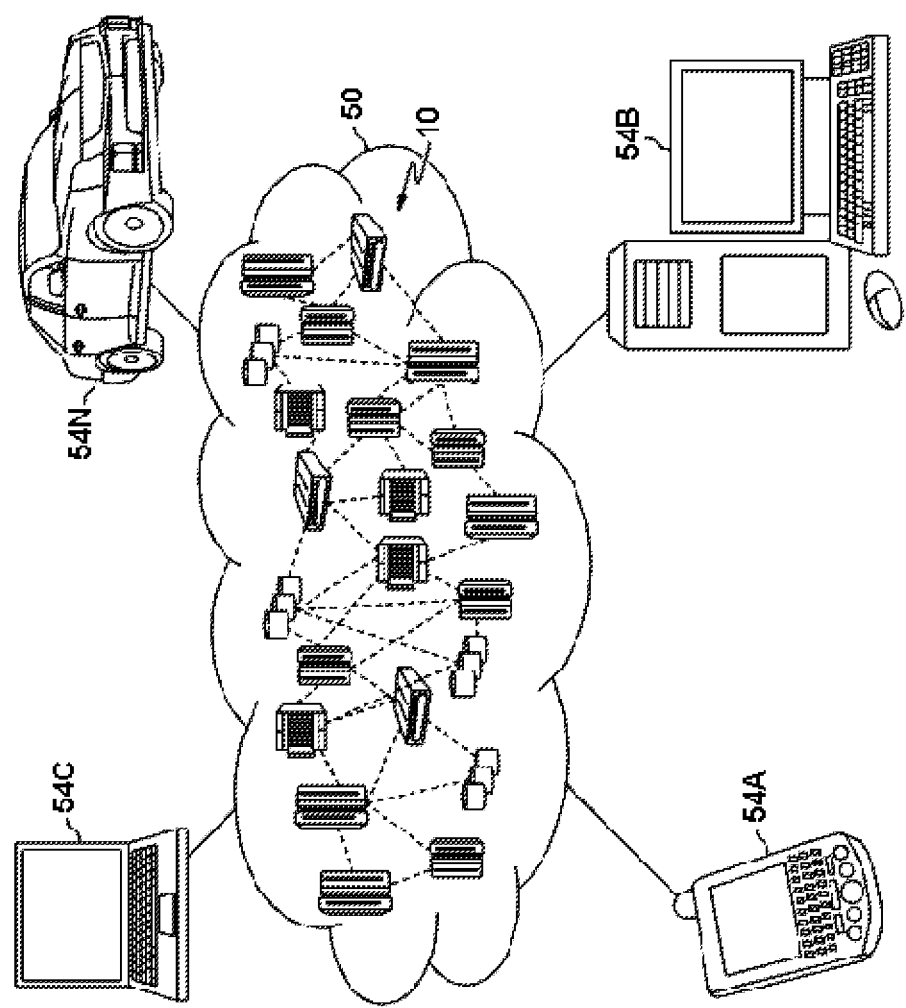
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
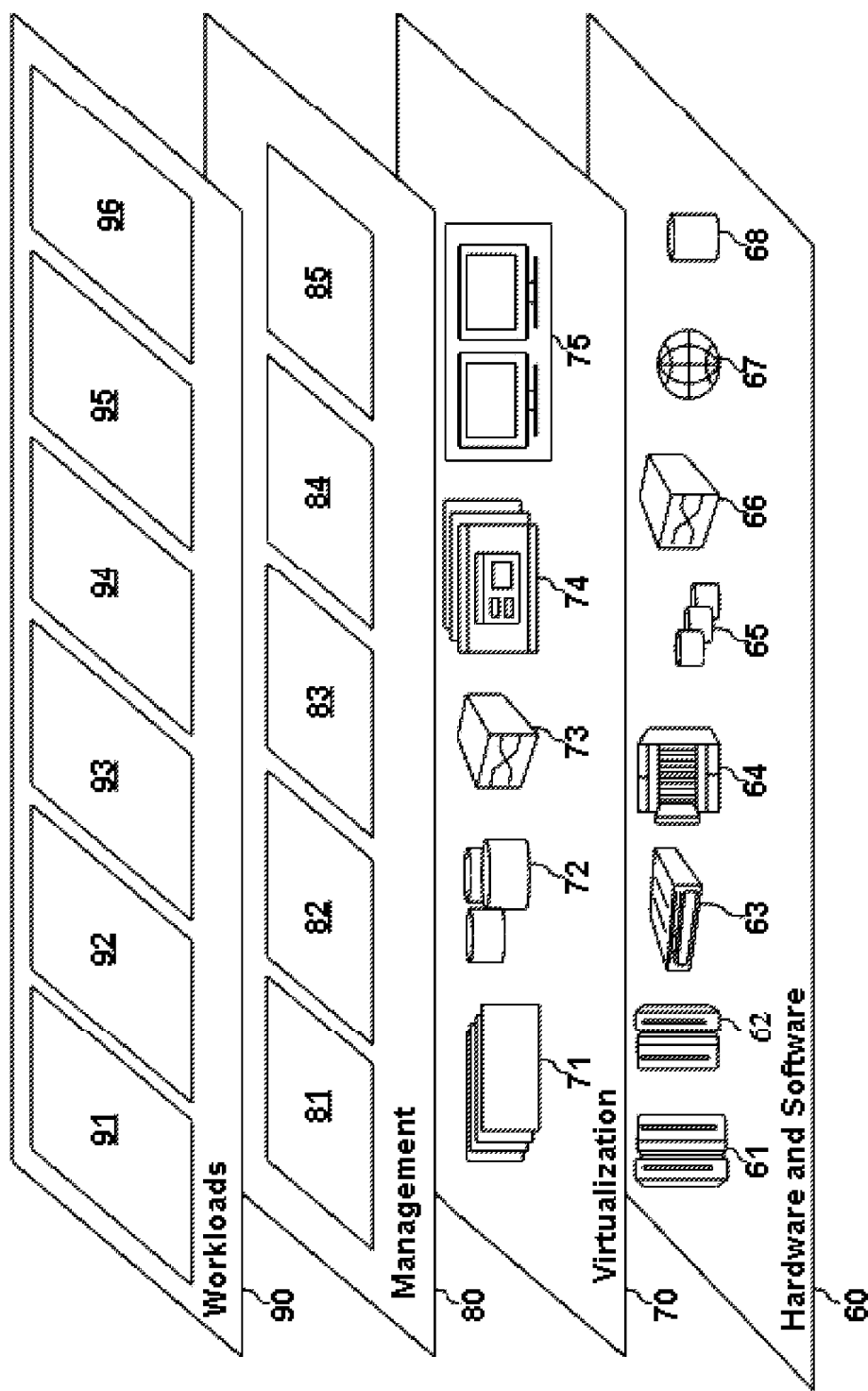
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data deduplication processes 96 described herein. In accordance with aspects of the invention, the data deduplication processes 96 workload/function operates to perform one or more of the processes described herein.

Figure 4:
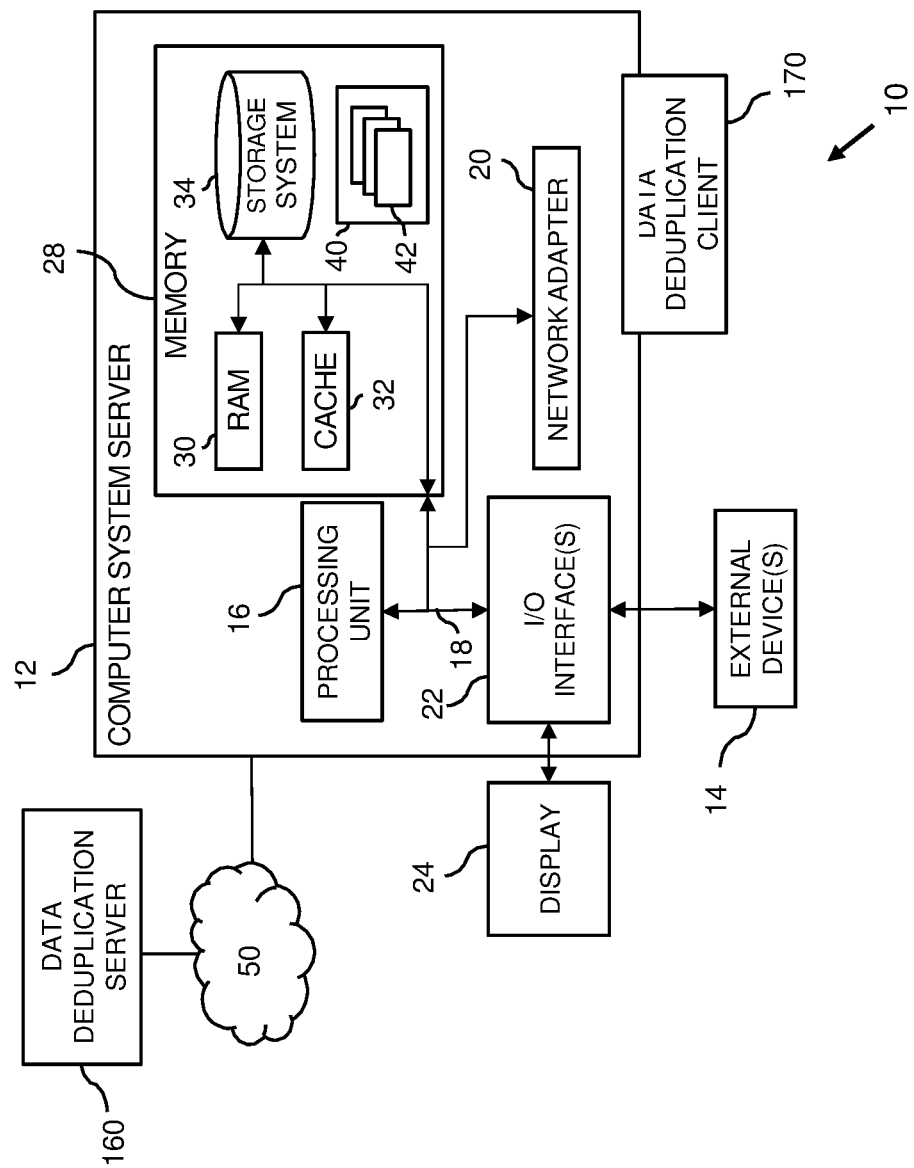
FIG. 4 depicts a cloud computing note according to another embodiment of the present invention.

FIG. 4 depicts a cloud computing node according to another embodiment of the present invention. In particular, FIG. 4 is another cloud computing node which comprises a same cloud computing node 10 as FIG. 1. In FIG. 4, the computer system/server 12 also comprises or communicates with a data deduplication client 170, and a data deduplication server 160.

In accordance with aspects of the invention, the data deduplication client 170 can be implemented as one or more program code in program modules 42 stored in memory as separate or combined modules. Additionally, the data deduplication client 170 may be implemented as separate dedicated processors or a single or several processors to provide the function of these tools. While executing the computer program code, the processing unit 16 can read and/or write data to/from memory, storage system, and/or I/O interface 22. The program code executes the processes of the invention.

By way of example, data deduplication client 170 may be configured to communicate with the data deduplication server 160 via a cloud computing environment 50. As discussed with reference to FIG. 2, for example, cloud computing environment 50 may be the Internet, a local area network, a wide area network, and/or a wireless network. In embodiments of the proposed data deduplication mechanism, the data deduplication server 160 may provision data to the client 170. One of ordinary skill in the art would understand that the data deduplication client 170 and data deduplication server 160 may communicate directly. Alternatively, a relay agent may be used as an intermediary to relay messages between data deduplication client 170 and data deduplication server 160 via the cloud computing environment 50.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Figure 5:
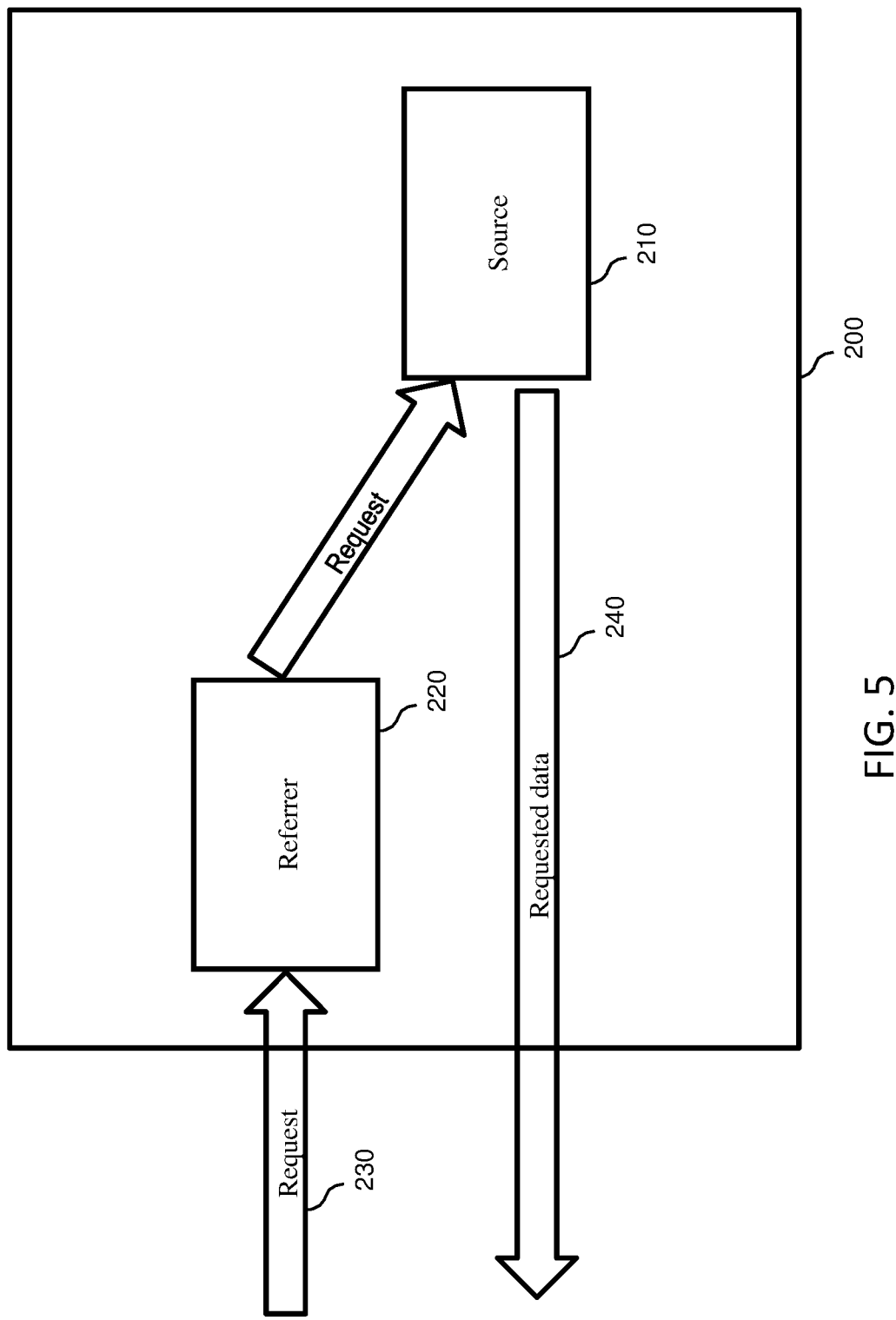
FIG. 5 depicts a schematic illustration of a system comprising a source and a referrer according to an embodiment of the invention.

FIG. 5 provides a schematic illustration of a system flow for a system 200 for handling a handover of ownership of data from a source 210 to a referrer 220 according to an aspect of the invention. The source comprises a virtual address, which comprises a physical address of a set of data on a system memory, and the referrer is adapted to point an incoming request 230 for the set of data to the virtual address of the source.

In the example shown in FIG. 5, the typical operation of the system 200, prior to the handover of ownership of the data from the source to the referrer has been performed, is shown. In particular, FIG. 5 shows an incoming request 230 received at the referrer 220, which is then pointed to the source 210. The requested data 240 may then be provided to the origin of the request, such as a user or a process that generated the received request.

By way of example, a user may initiate a process on a system in communication with the system 200 for handling the handover of ownership of data from a source 210 to a referrer 220. The initiated process may require access to data that has undergone data deduplication, meaning that the request 230 for the data is received at the referrer 220. The request is then pointed to the source 210 by the referrer 220 in order to retrieve the requested data 240, which may then be provided to the process.

Figure 6:
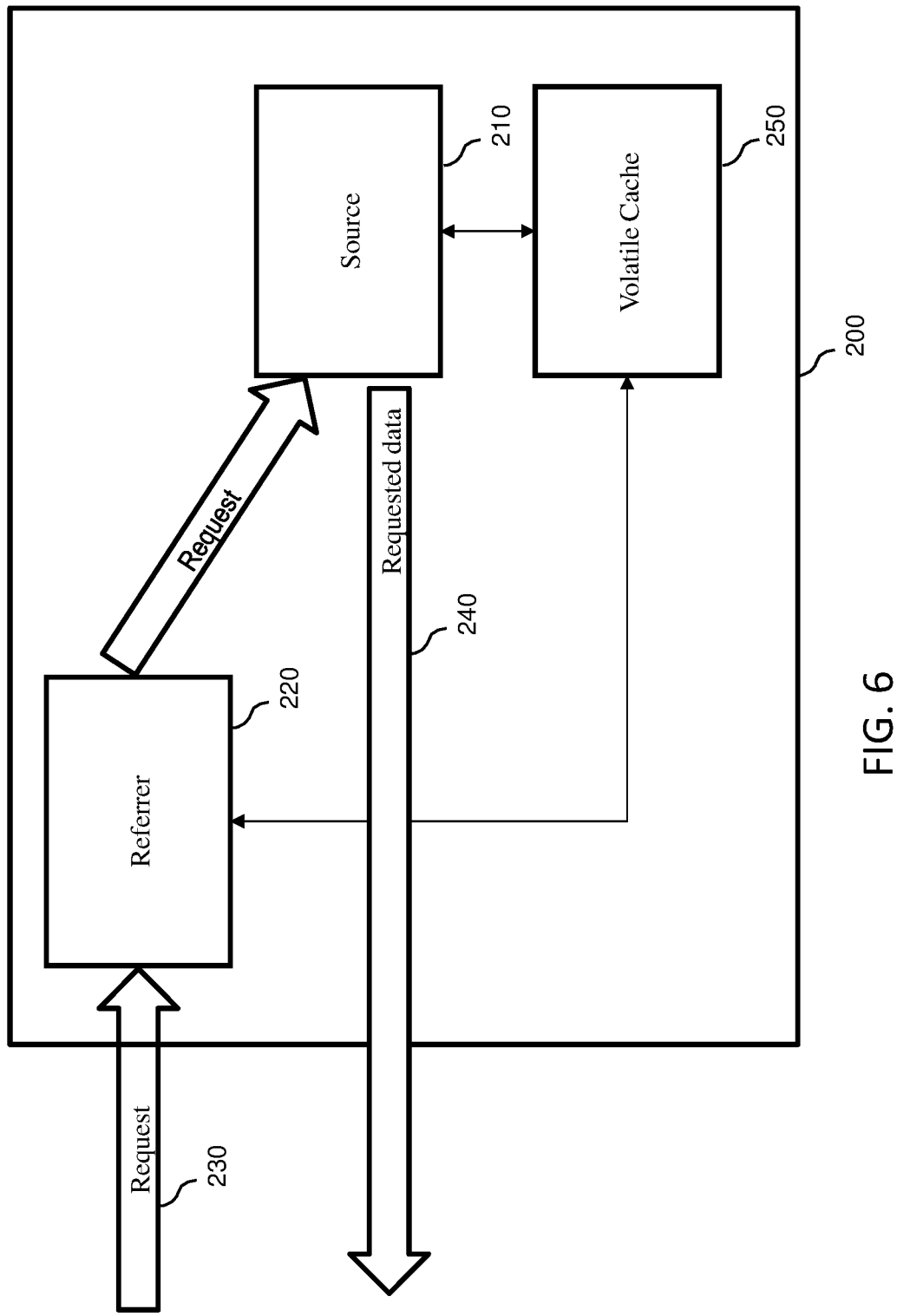
FIG. 6 depicts a schematic illustration of a system comprising a volatile cache according to a further embodiment of the invention.

FIG. 6 provides a schematic illustration of a system flow for a system 200 for handling a handover of ownership of data from a source 210 to a referrer 220 according to an aspect of the invention. In the example shown in FIG. 6, the system is adapted to identify a source 210 accessed by a request pointed to the source 210 by a referrer 220 and perform a handover of ownership of the virtual address of the identified source 210 to the referrer 220.

In the specific example shown in FIG. 6, the system comprises a volatile cache 250 adapted to identify the source 210 accessed by a request 230 pointed to the source 210 by a referrer 220. The volatile cache may be any form of volatile memory capable of storing data relating to the source 210 of the system. For example, the volatile cache 250 may be formed on a dynamic volatile memory unit or a static volatile memory unit.

The volatile cache 250 may be adapted to identify the source 210 accessed by the request 230 pointed to the source 210 by a referrer 220 by any suitable means. For example, the volatile cache may be in communication with the referrer 220 of system and may be adapted to obtain, or receive, data from the referrer 220 regarding an incoming request and which source 210 the referrer pointed to incoming request to. Alternatively, the volatile cache may be in communication with the source 210 and may be adapted to obtain, or receive, data from the source 210 responsive to a request being received at the source 210. In a further alternate example, the volatile cache may be in communication with a system input unit, which receives the requests 230 to the system, and may be adapted to obtain, or receive, data relating to the request 230 as it progresses through the system in order to identify the source 210 the request 230 is pointed to. The volatile cache may be adapted to store the identification of the sources 210 accessed in this manner.

As the volatile cache 250 is a volatile memory, there is no need to harden or mirror the data stored on the volatile cache 250. This provides the benefit of speeding up metadata access for sources 210, or source chunks, held on the volatile cache 250. In addition, the volatile cache 250 may provide a list of impactful candidate sources for performing a handover as discussed further below. In other words, it is proposed to include a volatile cache 250, in addition to conventional caches forming part of the system, which is dedicated to the deduplication sources present in the system. The volatile cache 250 may be read-only and can be used to optimize data access in a source 210 and referrer 220 system where a source 210 is frequently accessed, as described further below.

The volatile cache 250 may be relatively small in terms of memory footprint as the volatile cache does not need to hold the data stored by the source itself. Rather the volatile cache may only store the source metadata for the specific data address of interest. In this way, utilizing the volatile cache may remove the need to perform a metadata access operation to access the source metadata, which is normally managed in larger groups of sources and not as individual addresses. Accordingly, the volatile cache 250 may result in a more efficient data deduplication system.

Figure 7:
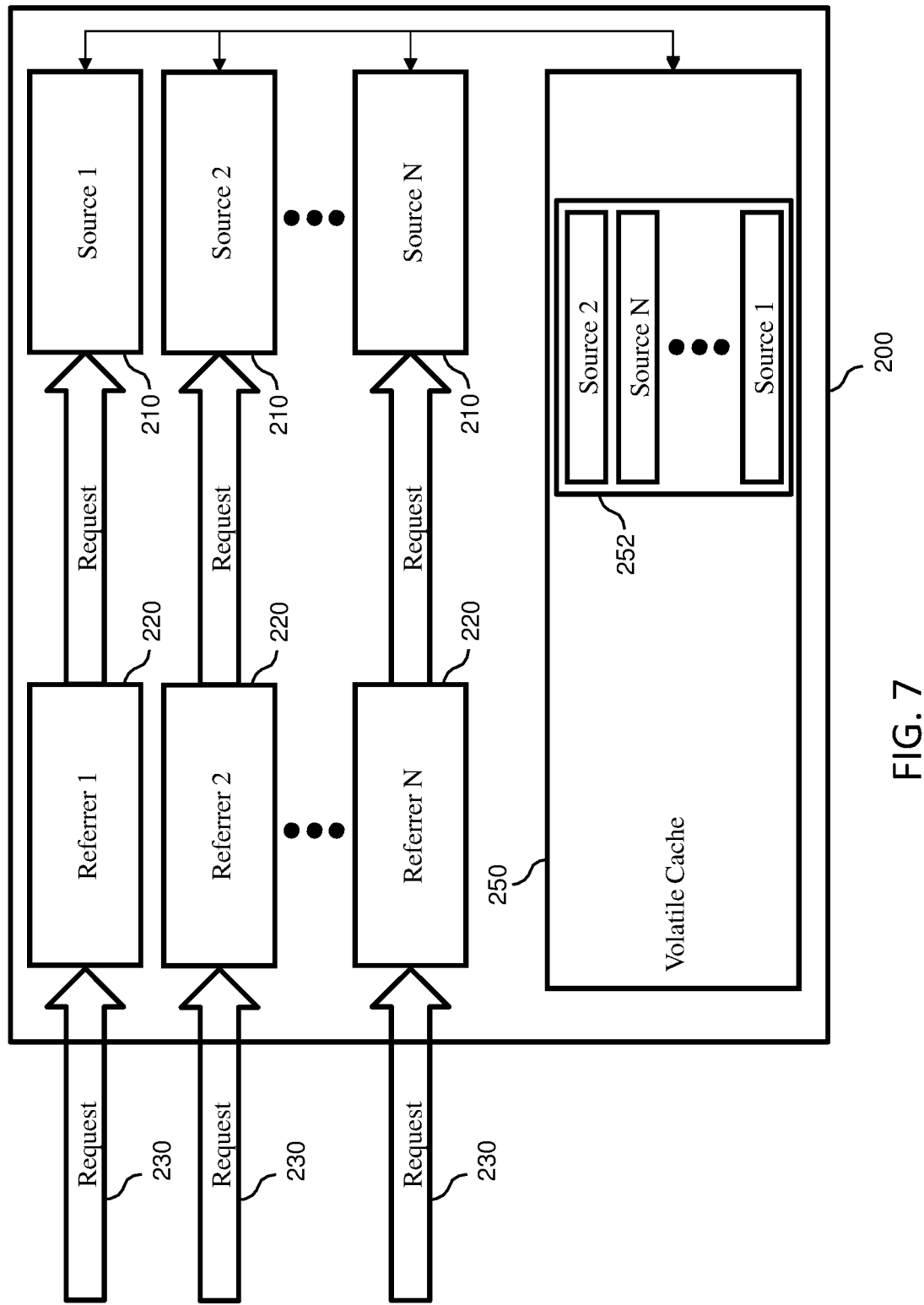
FIG. 7 depicts a schematic illustration of a system comprising a plurality of sources according to a further embodiment of the invention.

FIG. 7 provides a schematic illustration of a system flow for a system 200 for handling a handover of ownership of data from a source 210 to a referrer 220 according to an aspect of the invention. In the example shown in FIG. 7, the system comprises a plurality of sources 210 (Source 1, Source 2, . . . , Source N) and a corresponding plurality of referrers 220 (Referrer 1, Referrer 2, . . . , Referrer N) adapted to point incoming requests 230 to the plurality of sources 210.

In the example shown in FIG. 7, the volatile cache 250 may be further adapted to generate a list 252 of sources accessed by a request pointed to each source 210 by an associated referrer 220. In other words, as each source 210 is accessed by a request 230, pointed to the sources 210 by way of referrers 220, each source 210 may be added to a list of sources 210 maintained on the volatile cache. The volatile cache 250 may be adapted to monitor a characteristic of the sources 210 over time and sort the list of sources 210 according to the monitored characteristic. By way of example, the monitored characteristic may be an access frequency of the sources 210. However, the monitored characteristic may be any characteristic of the sources 210, such as: access frequency; number of referrers associated with a given source 210; a time period since the source 210 was last accessed; a period of time the source 210 has existed for; a characteristic of the data stored at the source 210; and the like.

If the volatile cache 250 is adapted to sort the list 252 according to the access frequency of the sources 210, for example using an active replacement cache (ARC) or heap protocol, the sources 210 that are accessed most frequently by their corresponding referrers will float to the top of the list 252. Sources that are not accessed often, even though they may have many references, will move to the bottom of the list 252 maintained on the volatile cache 250. Sources 210 that are accessed frequently may be referred to as hot sources and sources 210 that are not accessed frequently may be referred to as cold sources.

When the system 200 has being running for a sufficient amount time to populate the volatile cache 250 and the most frequently accessed sources have risen to the top of the list 252 maintained on the volatile cache, the system may choose one or more sources from the top of the list and perform a handover of data ownership from the sources to their corresponding referrers. The handover of the ownership of the data may be performed proactively, by selecting one or more of the sources at the top of the list and performing the handover, or opportunistically, by performing the handover for a source at, or near, the top of the list when it is accessed by a referrer.

Figure 8:
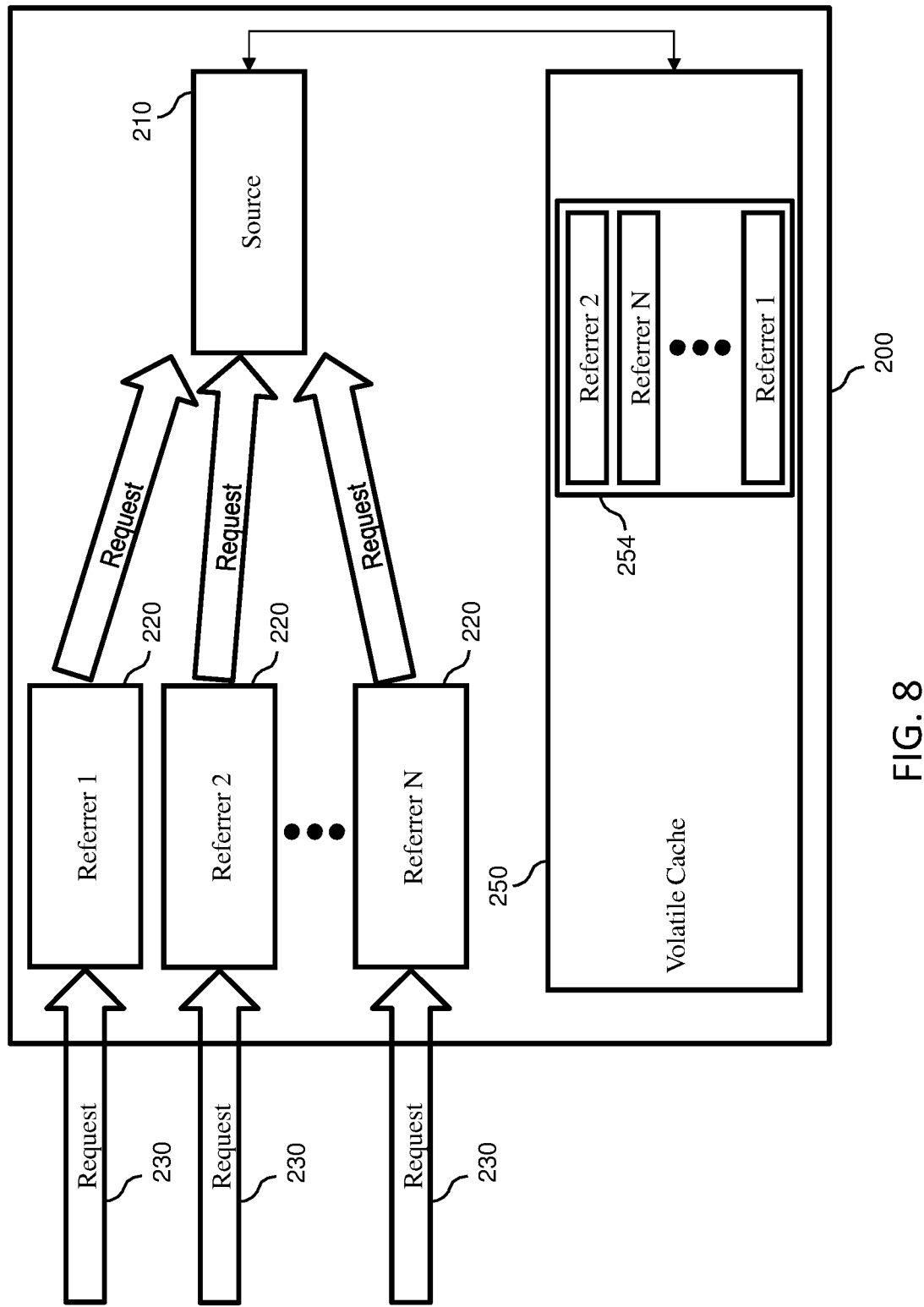
FIG. 8 depicts a schematic illustration of a system comprising a plurality of referrers according to a further embodiment of the invention.

FIG. 8 provides a schematic illustration of a system flow for a system 200 for handling a handover of ownership of data from a source 210 to a referrer 220 according to an aspect of the invention. In the example shown in FIG. 8, the system comprises a plurality of referrers 220 (Referrer 1, Referrer 2, ..., Referrer N) that point to a source 210. In this case, the volatile cache 250 may be further adapted to generate a list 254 of referrers 220 that point a request to the source 210 and the volatile cache 250 may, for example, be adapted to sort the list 254 of referrers 220 according to a frequency of requests 230 pointed to the source 210 by each referrer 220.

In other words, if a source 210 has more than one referrer 220 associated with it, the volatile cache 250 may record the frequency of access by separate referrers 220 and data relating to the referrers 220, such as referrer metadata. In this case, a handover of ownership of the data from the source 210 to a referrer 220 may be performed such that the referrer 220 that points requests 230 to the source 210 with the greatest frequency may receive ownership of the data as this may have the greatest impact on the performance of the system compared to the other referrers 220 associated with the sources 210.

Figure 9:
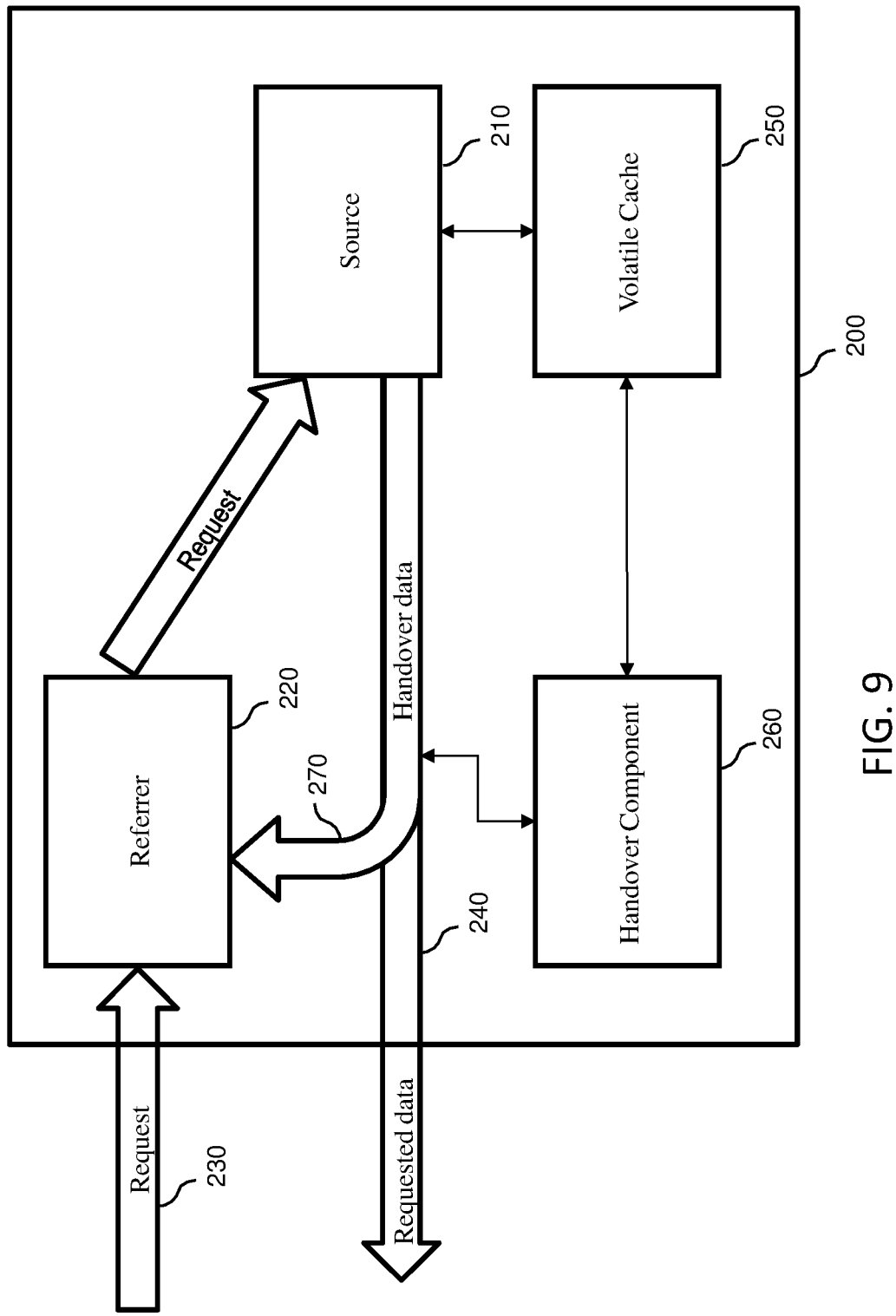
FIG. 9 depicts a schematic illustration of a system comprising a handover component according to a further embodiment of the invention.

FIG. 9 provides a schematic illustration of a system flow for a system 200 for handling a handover of ownership of data from a source 210 to a referrer 220 according to an aspect of the invention. In the example shown in FIG. 9, the system further comprises a handover component 260 adapted to perform the handover 270 of ownership of the virtual address of the identified source 210 to the referrer 220. As described above with reference to FIG. 7, the system may comprise a volatile cache 250 adapted to identify a plurality of sources 210 accessed by requests pointed to each of the sources 210 by an associated referrer 220 and generate a list of the plurality of sources 210 accessed.

The handover component 260 may be adapted to select one or more of the sources 210 from the list of sources and perform a handover 270 of the ownership of the virtual address from the selected one or more sources 210 to the referrers 220 associated with each selected source 210. By way of example, the volatile cache 250 may be adapted to monitor a characteristic of the sources 210 over time, such as the access frequency of each of the sources 210, and the handover component 260 may be adapted to select the one or more of the sources 210 from the list of sources based on the monitored characteristic.

For example, the handover component 260 may be adapted to pick the top candidate sources, i.e. the sources 210 at the top of the list maintained on the volatile cache 250, off the volatile cache 250 and perform the handover 270 of the ownership of the data stored at the source 210 to the referrer 220. The handover component 260 may be adapted to leave behind data ownership change hints at the source 210 so that other referrers 220 looking to the source 210 will be redirected to look to the new owner of the data, i.e. the referrer now in possession of the ownership of the data. Put another way, the system may be further adapted to, after the handover of ownership of the virtual address from the source 210 to the referrer 220 has been performed, update the source 210 and the referrer 220 to point an incoming request 230 to the virtual address at the referrer 220.

When handover is being performed taking place, both the old and new source (i.e. the original source and the original referrer) may store the number of references associated with the old source that have not yet been updated. This is the number of references associated with the source that are still unaware of the handover of ownership of the data, and therefore may be treated in a special way to avoid data integrity issues. For example, when a referrer that has not yet been updated points to the original source, the original source may point the referrer to the new source. Further, the referrer may then be updated to automatically point to the new source from now on and the number of references that have not been updated, as maintained on the old source and the new source, may be reduced.

The system may be further adapted to, after the handover of ownership of the virtual address from the source to the referrer has been performed, update the list of sources maintained on the volatile cache to remove the sources that have undergone the handover process. Thus, the list of sources maintained on the volatile cache may be continually updated to reflect the most recent handover of ownership within the system.

The invention may be composed of two main components, the volatile cache and the handover component, working together to support a proactive, or opportunistic, change of ownership for the most impactful data sources within the system. By combining these components in the manner described above, the system for handling a handover of ownership of data in the deduplication system may consume very few resources and adapt overtime to greatly improve the performance of the deduplication system.

Figure 10:
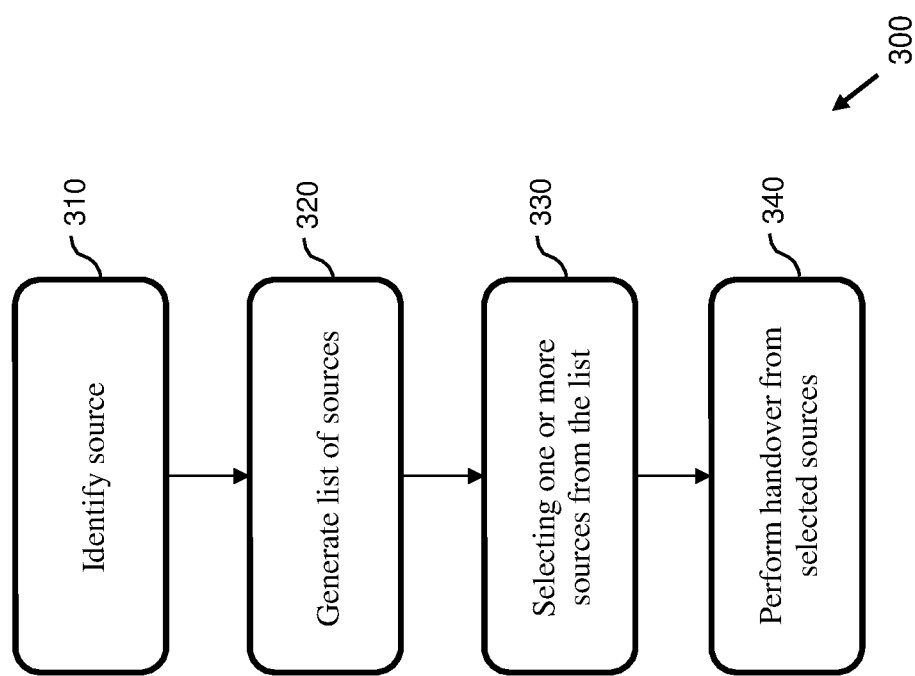
FIG. 10 depicts a method for handling a handover of ownership of data from a source to a referrer of a system according to an embodiment of the invention.

FIG. 10 depicts a method 300 for handling a handover of ownership of data from a source to a referrer of a system according to an aspect of the invention. The method begins in step 310 by identifying a source accessed by a request pointed to the source by a referrer.

In step 320, a list of sources accessed by a request pointed to each source by an associated referrer is generated. The list of sources may be generated by way of a volatile cache as described above. In step 330, one or more of the sources are selected from the list of sources, for example, by way of a handover component. The one or more sources may be selected based on a monitored characteristic of the sources, such as an access frequency of the sources. For example, the most frequently accessed sources may be selected.

In step 340, a handover of the ownership of the virtual address from the selected one or more sources to the referrers associated with each selected source is performed by way of the handover component.

It should now be understood by those of skill in the art, in embodiments of the present invention, the proposed concepts provide numerous advantages over conventional data deduplication and data ownership handover approaches. These advantages include, but are not limited to, efficient and accurate handover of data ownership from a source to a referrer. In embodiments of the present invention, this technical solution is accomplished by way of a volatile cache.

In still further advantages to a technical problem, the systems and processes described herein provide a computer-implemented method for efficient data deduplication and data ownership handovers provided on (or via) on a distributed communication network. In this case, a computer infrastructure, such as the computer system shown in FIGS. 1 and 4 or the cloud environment shown in FIG. 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for volume allocation in dynamic volume pooling, the computer-implemented method comprising:
    identifying, by one or more computer processors, a source accessed by a request pointed to the source by a referrer, wherein the source includes a virtual address, and wherein the virtual address includes a physical address of a set of data in a system memory, and wherein the referrer is adapted to point an incoming request for the set of data to the virtual address of the source; and
    performing, by one or more computer processors, a handover of ownership of the virtual address of the identified source to the referrer.

2. The computer-implemented method of claim 1, further comprising:
    identifying, by one or more computer processor, the source accessed by the requested pointed to the source by the referrer using a volatile cache.

3. The computer-implemented method of claim 1, further comprising:
    wherein the source comprises a plurality of sources; and
    generating, by one or more computer processors, a list of sources of the plurality of sources in a volatile cache that are accessed by the requested pointer to each source of the plurality of sources by their associated referrer.

4. The computer-implemented method of claim 3, further comprising:
    monitoring, by one or more computer processors, one or more characteristic of the sources over time; and
    modifying, by one or more computer processors, the list of sources of the plurality of sources based on the one or more characteristics.

5. The computer-implemented method of claim 4, wherein the one or more characteristics includes at least an access frequency of each source of the plurality of sources.

6. The computer-implemented method of claim 2, further comprising:
    wherein the referrer comprises a plurality of referrers; and
    generating, by one or more computer processors, a list of referrers of the plurality of referrers in a volatile cache that point a request to the source.

7. The computer-implemented method of claim 6, wherein the list of referrers is sorted based on a frequency of requests pointed to the source by each referrer of the plurality of referrers.

8. The computer-implemented method of claim 7, wherein the volatile cache is read-only.

9. A computer program product for volume allocation in dynamic volume pooling, the computer program product comprising:
    one or more computer readable storage media; and
    program instructions stored on the one or more computer readable storage media, the program instructions comprising:
        program instructions to identify a source accessed by a request pointed to the source by a referrer, wherein the source includes a virtual address, and wherein the virtual address includes a physical address of a set of data in a system memory, and wherein the referrer is adapted to point an incoming request for the set of data to the virtual address of the source; and
        program instructions to perform a handover of ownership of the virtual address of the identified source to the referrer.

10. The computer program product of claim 9, further comprising program instructions, stored on the one or more computer readable storage media, to:
    identify the source accessed by the requested pointed to the source by the referrer using a volatile cache.

11. The computer program product of claim 9, further comprising program instructions, stored on the one or more computer readable storage media, to:
    wherein the source comprises a plurality of sources; and
    generate a list of sources of the plurality of sources in a volatile cache that are accessed by the requested pointer to each source of the plurality of sources by their associated referrer.

12. The computer program product of claim 11, further comprising program instructions, stored on the one or more computer readable storage media, to:
    monitor one or more characteristic of the sources over time; and
    modify the list of sources of the plurality of sources based on the one or more characteristics.

13. The computer program product of claim 12, wherein the one or more characteristics includes at least an access frequency of each source of the plurality of sources.

14. The computer program product of claim 10, further comprising program instructions, stored on the one or more computer readable storage media, to:
    wherein the referrer comprises a plurality of referrers; and
    generate a list of referrers of the plurality of referrers in a volatile cache that point a request to the source.

15. A computer system for volume allocation in dynamic volume pooling, the computer system comprising:
    one or more computer processors;
    one or more computer readable storage media; and
    program instructions, stored on the one or more computer readable storage media for execution by at least one of the one or more computer processors, the program instructions comprising;
        program instructions to identify a source accessed by a request pointed to the source by a referrer, wherein the source includes a virtual address, and wherein the virtual address includes a physical address of a set of data in a system memory, and wherein the referrer is adapted to point an incoming request for the set of data to the virtual address of the source; and
        program instructions to perform a handover of ownership of the virtual address of the identified source to the referrer.

16. The computer system of claim 15, further comprising program instructions, stored on the one or more computer readable storage media for execution by the at least one of the one or more computer processors, to:

identify the source accessed by the requested pointed to the source by the referrer using a volatile cache.

17. The computer system of claim 15, further comprising program instructions, stored on the one or more computer readable storage media for execution by the at least one of the one or more computer processors, to:

wherein the source comprises a plurality of sources; and generate a list of sources of the plurality of sources in a volatile cache that are accessed by the requested pointer to each source of the plurality of sources by their associated referrer.

18. The computer system of claim 17, further comprising program instructions, stored on the one or more computer readable storage media for execution by the at least one of the one or more computer processors, to:

monitor one or more characteristic of the sources over time; and modify the list of sources of the plurality of sources based on the one or more characteristics.

19. The computer system of claim 18, wherein the one or more characteristics includes at least an access frequency of each source of the plurality of sources.

20. The computer system of claim 16, further comprising program instructions, stored on the one or more computer readable storage media for execution by the at least one of the one or more computer processors, to:

wherein the referrer comprises a plurality of referrers; and generate a list of referrers of the plurality of referrers in a volatile cache that point a request to the source.

* * * * *